Dec. 1, 1953　　　T. W. ZOBEL ET AL　　　2,660,916
TEST EQUIPMENT FOR MEASURING THE FLATNESS AND PLANE
PARALLELISM OF GLASS SURFACES OF ANY DESIRED SIZE
AND THICKNESS BY LIGHT WAVE INTERFERENCE
Filed July 25, 1950　　　　　　　　　　　　　　　2 Sheets-Sheet 1
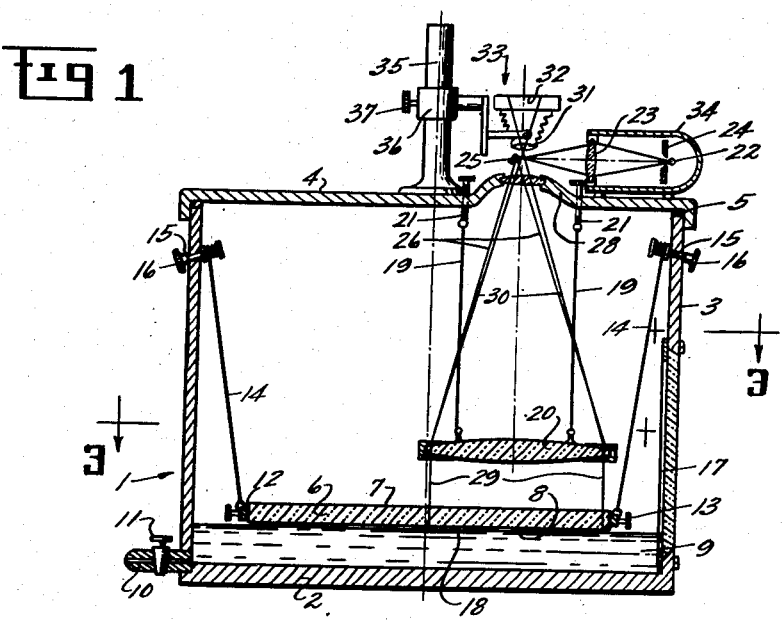
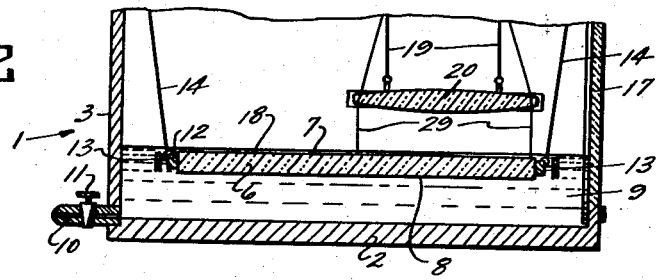
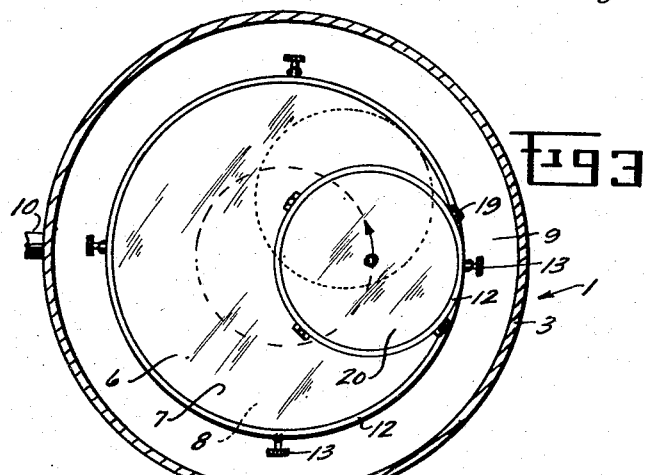
INVENTORS.
THEODOR W. ZOBEL
FERDINAND MIRUS
BY
ATTORNEYS

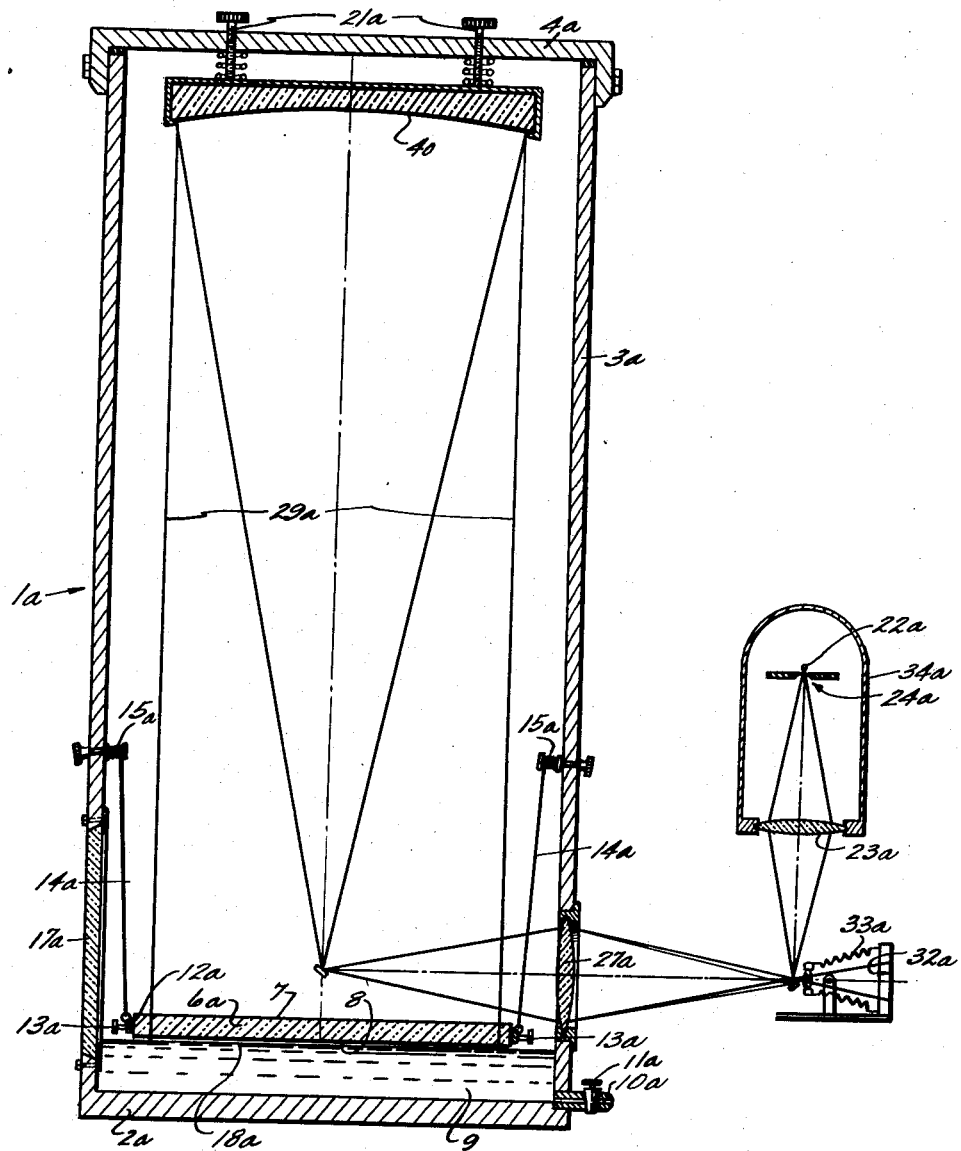

UNITED STATES PATENT OFFICE 2,660,916

TEST EQUIPMENT FOR MEASURING THE FLATNESS AND PLANE PARALLELISM OF GLASS SURFACES OF ANY DESIRED SIZE AND THICKNESS BY LIGHT WAVE INTERFERENCE

Theodor W. Zobel, Braunschweig, and Ferdinand Mirus, Weiner, Germany

Application July 25, 1950, Serial No. 175,846

3 Claims. (Cl. 88—14)

(Granted under Title 35, U. S. Code (1952), sec. 266)

The invention described herein may be manufactured and used by or for the Government for governmental purposes without payment to us of any royalty thereon.

This invention relates to test and evaluation equipment for measuring flatness and plane parallelism of glass surfaces of any desired size and thickness by light wave interference, and more particularly to interferometer apparatus for investigating the flatness of unusually large beam splitting plates and opaque mirrors by the use of a liquid reflecting surface as a substitute for the comparison or measuring "plate."

Since the use of interferometers having large covering power, employing unusually large reflectors and beam splitting plates, is especially desirable for military wind tunnel investigations of air flow around streamlined air foil sections, great difficulty has been encountered in providing satisfactory means for measuring the flatness and quality of these unusually large plates in order to ascertain if the plates are as optically perfect and flat as is reasonably possible. In interferometer test and evaluation work on glass optical "flats" in the past, no special trouble has been experienced because only relatively small size plates were investigated, which required only relatively small size comparison plates.

Since the interferometer methods and other optical processes are of increasing importance in air research work and other problems, the desirability and requirement for larger size plates is essential for future satisfactory interferometer work. It has been found extremely difficult, if not impossible, to make satisfactory very large comparison plates of highest quality for use in investigating glass reflecting surfaces of these unusually large optical flats and mirrors that are subsequently employed in interferometers.

It is desirable to survey the entire surface conditions covering the entire comparison plate, over the entire field of the reflecting surface of the plate to be investigated, which necessarily requires the comparison plate to be as extensive as the plate having the reflecting surface to be investigated.

It must be understood that when a comparison or testing plate of glass or other rigid material is made, having a comparison reflecting surface that is supposed to be optically flat with the highest obtainable accuracy that could be produced by repeated grinding, polishing and testing, this surface would be only an approximation of a perfect optically flat reflecting surface. Even to obtain this accuracy in large plates is very expensive, requiring extremely tedious and extensive time-consuming operations.

The degree of perfection and accuracy of the reflecting surface of a glass or rigid reflector plate is determined by the minimum number of interference rings or fringes which appear in the entire surface of the plates when inspected by the interferometer method. Since a minimum number of interference fringes only are allowed in the surface the number of interference fringes in the surface of a plate increases with the square of the diameter. When larger plates are made and tested the degree of accuracy of the larger plates must therefore be much greater than the accuracy of the smaller plates. For instance, when an equally "curved" (supposed to be flat) plate becomes enlarged to four times its diameter, the number of fringes will be increased sixteen times over the fringes in the smaller plate. Since the defined accuracy of the small plate must be retained also in the larger plate, the larger plate, in the example, must be sixteen times more perfect than the small one.

In comparing the quality of an unknown reflector plate with that of a known "comparison plate" the interference phenomena is produced within a layer of air or space between the comparison plate and the unknown plate to be investigated. It does not make any material difference whether the comparison plate is installed above or below the plate to be investigated. It is only important that the surface to be investigated must be supported in contact with the known comparison reflecting surface or installed a small distance from it so that the coherent length of the monochromatic light which is used is long enough for producing good interference fringes. If the plate to be tested is located horizontally above the comparison reflecting surface then its lower reflecting surface becomes the surface being tested. If the plate to be tested is located horizontally below the comparison surface of the comparison plate, then its upper reflecting surface is the one being tested.

In carrying out our invention, a liquid medium is used having a liquid reflecting surface which is employed as the comparison "plate" or surface. Since this liquid reflecting surface is inherently level and flat for all practical purposes at all times, it constitutes a simple, inexpensive, and satisfactory comparison reflecting surface or plane for our improved interferometer apparatus for the testing and evaluation of the condition and degree of flatness of reflecting surfaces of both opaque or full mirrors, and for testing the plane parallel relation and condition of the reflecting surfaces of beam splitting plates of large diameters. Since the reflecting surface of a non-viscous liquid is perfectly flat for all practical purposes there is no limit to the size of interferometer reflector plates that can be tested or evaluated. The main elements of prime importance are, that the size of the receptacle for holding the reflecting liquid is sufficient to receive the plate to be tested, that the surface of the area of the reflecting liquid is sufficiently large or extensive to cover, or extend beyond the periphery of the plate or mirror being tested, and that the apparatus be so firmly and rigidly mounted as to be free from any vibration that might disturb the reflecting surface of the liquid during the testing and evaluating operation. It is also found desirable to inclose the liquid and the plate to be tested, thus preventing dust and foreign matter from reaching and disturbing the liquid surface.

In carrying out our invention, supporting means are provided for supporting and adjusting the reflector plates to be tested within a closed receptacle containing the reflecting liquid so that the reflecting surface being compared and evaluated is in precise parallel relation to the comparative liquid reflecting surface and located either just below the lower reflecting surface of the plate to be tested when a liquid having an opaque reflecting surface is or may be used, or that the liquid reflecting surface is located just above the upper reflecting surface of the plate to be tested, in which the liquid and liquid reflecting surface must be partially transparent.

In investigating large size reflector plates, such as those having diameters from 36 inches to 72 inches or larger, the liquid reflecting surface must extend sufficiently beyond the edge of the plate being tested so that curvature of the liquid reflecting surface adjacent the sides of the container will not be present under, or over the plate to be tested.

Our invention also includes an optical system for introducing a collimated beam of the monochromatic light on an axis perpendicular, or substantially perpendicular, liquid reflecting surface, and then converging the reflected returned interference light beam from the surfaces through a lens system into an image plane or onto an image screen where the same may be inspected or recorded. This optical system in a preferred form includes a small system which is smaller than the plate to be tested, and mounted above the plate and the reflecting liquid in such a manner that it can be moved above any portion of the plate to selectively or progressively cover, inspect and evaluate the entire reflecting surface of the plate being tested. This shiftable optical system utilizes a symmetrical light inlet source having a large aperture. A concave reflector may also be used for collimating the light in a large beam towards the liquid reflecting surface and simultaneously illuminating the entire surface of the plate being tested, utilizing a very small opaque mirror inclined across the inlet light beam at the focal point of the concave reflector for introducing the monochromatic light beam at the focal point and reflecting the interference beam from the reflecting surfaces of the liquid and the comparative plate out of the collimated beam and through a lens member in the side receptacle holding the testing plate and the reflecting liquid. A transparent plate or window is also installed in the side of the receptacle.

Other objects and advantages of the invention will become apparent from the following description, taken in connection with the accompanying drawings, in which like reference characters refer to like parts in the several figures.

Fig. 1 is a vertical sectional view taken through one form of our improved interferometer testing apparatus, illustrating the optical system supported on the cover of the liquid receptacle and movable with the cover as a unit above the liquid reflecting surface and the reflecting surface of the plate being tested to selectively and progressively inspect and evaluate the entire reflecting surface area of a plate which is larger than the lens in the optical system;

Fig. 2 is a fragmentary vertical sectional view illustrating the lower portion of the apparatus shown in Fig. 1, and showing the comparative plate being inspected, located just below the reflecting surface of the liquid, for the purpose of evaluating the quality of upper reflecting surface of the plate;

Fig. 3 is a somewhat diagrammatic horizontal sectional view taken through the receptacle approximately on the plane indicated by line 3—3 in Fig. 1; and Fig. 4 is a vertical sectional view illustrating a modified form of our invention in which a large concave reflector is used, adjustably mounted on the cover of the receptacle and having a diameter substantially equal to the diameter at the plate to be inspected, illustrating an optical arrangement for introducing a concentrated beam of monochromatic light at the focal point of the concave reflector and reflecting the beam toward the concave reflector by a small fixed mirror which is inclined across the beam at the focal point also and utilizing this small mirror to reflect the light interference beams from the liquid and plate reflecting surfaces out of the receptacle.

Referring more particularly to Figs. 1, 2 and 3 of the drawings the reference numeral 1 denotes a closed receptacle or container, preferably cylindrical, having a bottom 2 and an annular side wall 3. A cover 4 is provided, having gasket or bearing means 5 between the same and the upper edge of the receptacle 1. A relatively large reflector plate 6 or mirror to be inspected and evaluated is suspended horizontally within the receptacle as shown in Figs. 1 and 3, the plate having upper and lower reflecting surfaces 7 and 8 to be investigated. A suitable preferably non-viscous reflecting liquid 9 is introduced into the bottom portion of the liquid receptacle 1, either before the cover is placed in position or the reflecting liquid may be introduced through a conduit 10 having a rotary plug valve 11 therein. The comparative reflector plate 6 is adjustably supported by any suitable means within the container 1, such as by an annular band or ring 12 having securing screws 13 engaging the periphery plate. The band 12 is suspended by suitable wires, cables supporting connectors 14 connected to the supporting band 12 at least at three equally spaced points around the periphery of the plate 6. The upper ends of the supporting cable 14 are connected to or wrapped around adjusting screws 15 which are suitably journalled in bearings which are mounted in the side walls 3 of the receptacle as shown. Each adjusting screw 15 has a large adjusting head or flange 16 thereon for easy manipulation and adjustment of the reflector plate.

An opening formed in one side of the wall 3 of the receptacle 1 is an observation window 17 for observing the relative adjustment between plate being tested and the reflecting surface of the reflecting liquid 9.

The reflecting liquid 9 may be any suitable liquid, such as water, alcohol, or even mercury when it is desired to mount the plate to be inspected above the surface of the liquid as shown in Fig. 1 of the drawing. In this figure of the drawings the reflecting surface of the liquid is indicated at 18 and the reflecting surface of the glass plate to be investigated is indicated at 8 and located slightly above, and horizontal to, the liquid reflecting surface 18. In Fig. 2 the reflecting surface 7 is the surface of the plate being investigated and is located slightly below the liquid reflecting surface 18. Under the conditions illustrated in Fig. 2 a transparent or partially transparent reflecting liquid must be used, such as water, alcohol, etc.

Suspended from the rotatably adjustable cover 4, by a plurality of adjusting supporting cables or rods 19, is a collimating solid glass lens and light intake and return unit. The lens 20 may be tilted slightly by adjustment of the screws 21 which extend through the cover 4 and are attached to the suspension rods or cables 19.

A monochromatic light source is indicated at 22 having a suitable lens system 23 for gathering the light which passes a light aperture 24, converging the same at a focal point or substantially at a focal point on an inclined mirror plate 25 of small area which reflects the beam downwardly toward the lens 20, the focal point of the lens 20 being located coincident to the focal point of the lens 23. The expanding beam of monochromatic light 26, passes through a lens member 27 which is fixed in a raised portion 28 formed in the cover of the receptacle 4, the light beam being collimated by the lens 20 to form a collimated light beam 29 projected downwardly toward the liquid reflecting surface 18, perpendicular thereto. Part of the collimated light beam strikes the lower reflecting surface 8 of the comparative plate being tested and is reflected upwardly through the lens 20. Part of the collimated light beam passes through the lower reflecting surface 8 of the comparative plate and is reflected upwardly by the reflecting surface 18 of the liquid, forming the interference beam. Variations in the parallelism between similar areas of the liquid reflecting surface 18 and the juxtaposed reflecting surface 8 of the plate being tested will produce light wave interference between respective reflected or returning beams from these two surfaces.

This return or interference beam, indicated at 30, passes through the lens 27 which is disposed on an axis located slightly at one side of the axis of the inlet beam 26. This permits the interference beam to pass through a lens 31 which is focused on an image screen 32, where the image may be inspected, or the interference image may be recorded on a sensitized surface located within a camera structure 33. The monochromatic light source, and lens member 23 is preferably mounted within a projector casing 34 fixed to the top of the adjustable cover 4. The camera unit 33 is preferably carried by a vertical standard 35 which projects upwardly from the center of the cover 4. A supporting collar 36 comprises means for slidably mounting the camera unit 33 on the standard 35, the collar 36 having a clamping screw 37 for adjusting the collar and adjusting the camera vertically to control the size of the interference image or the image screen.

Since the solid lens 20 has a diameter which slightly exceeds one-half the diameter of the large plate 6 being inspected, rotation of the cover 4 progressively moves the lens 20 and its associated optical or interference system so that the entire surface of the comparative plate 6 can be progressively and selectively investigated by the light wave interference method, as shown diagrammatically in Fig. 3.

When it is desired to inspect the other or upper reflecting surface of the comparative plate 6 the adjusting screws 16 are manipulated to lower the plate 6 so that the upper reflecting surface 7 is slightly below the reflecting surface of the liquid. The reflecting surface of the liquid may be raised by introducing a greater volume of the liquid into the receptacle through the conduit 10. The lens system functions as before described except that the light interference phenomena is now between the reflecting surface of the liquid and the upper reflecting surface 7 of the plate being inspected, instead of between the reflecting surface 18 of the liquid and the lower reflecting surface 8 of the plate, as previously described in connection with Fig. 1. Of course, under the latter conditions as shown in Fig. 3, the reflecting surface 18 of the liquid, must be transparent so that the collimated light beam 29 will be simultaneously reflected from both the reflected surface 18 of the liquid and the upper reflecting surface 7 of the tested plate in order to produce the interference light beams and interference fringes on the image screen 32.

From the above it will be observed that by utilizing the upper or reflecting surface of a suitable liquid such as water for the comparison surface an absolutely flat reflecting surface is obtained which is also horizontal or level and it only remains necessary to provide a receptacle which is slightly larger than any reasonably large reflector plate which is to be evaluated so that the portion of the liquid reflecting surface immediately adjacent to the sides of the container is not used for reflections. This arrangement provides an efficient and inexpensive method for the testing and evaluation of large flat reflecting surfaces in which the comparison reflecting surface of the liquid being used is inherently about as optically perfect as can be obtained, and any defects or optical inaccuracies in the reflecting surface which show up in the interference beam are necessarily formed by inaccuracies in the reflecting surface of the plate being tested, and cannot possibly be accredited to defects or unevenness in the reflecting surface of the reflecting liquid, providing that excessive dust and foreign matter is kept out of the receptacle and the liquid reflecting surface is maintained quiescent.

In Fig. 4 of the drawings the same general arrangement is employed, but instead of utilizing a movable optical inspection system as shown in Figs. 1 to 3 and moving the same uniformly above the reflecting surface of the liquid, and above the reflecting surface of the plate being evaluated, the liquid container or receptacle 3a shown in Fig. 4 is somewhat taller, and the monochromatic light beam is introduced through a lens 27a which is fixed in an opening in the side wall of the container 3a, relatively close to and above the reflecting surface of the liquid. A large concave mirror 40 having an area sufficient to cover the comparative plate is horizontally mounted just below the cover 4a of the receptacle 3a, three adjusting screws 21a being provided for adjusting the optical axis, position and focal point of the mirror 40 within the casing 3a. The focal point of the concave mirror 40 is located just above the reflecting surface 18a of the liquid, and above the space to be occupied by reflector plate 6a to be evaluated. A small reflector plate or mirror 25a is inclined across the focal point of the concave mirror 40, or very close to it at an angle of substantially 45 degrees having a very small area so as to reflect the incoming converging monochromatic light beam from the light source, concentrated on the mirror 25a to or at the focal point of the concave mirror 40.

The incoming monochromatic light source comprising a rigidly mounted projector having a casing 34a which incloses a monochromatic light source 22a, controlled by a stop aperture 24a, and including a lens 23a for gathering the light passing through the aperture to produce a converging light beam to substantially a focal point on the second small full mirror 25b inclined across the respective intersecting optical axes of the two lens units 27a and 23a. The mirror 25b reflecting a monochromatic light beam through the lens 27a, which in turn converges the beam onto the small inclined reflector 25a located at the focal point of the large concave mirror 40. The reflecting surface of the mirror 40, in turn, reflects the light beam received from the mirror 25a toward the liquid reflecting surface 18a of the liquid in the bottom of the container 1a, in a collimated beam 29a perpendicular to the liquid reflected surface 18a.

The plate 6a to be evaluated is suspended by suitable adjustable supporting means such as cables 14a, which are connected at their lower ends to an annular band 12a having clamping means such as clamping screws 13a for engaging the tested plate and securing the same within the band. The upper ends of the supporting cables 14a are adjustable similar to the structure shown also in Fig. 1, the same being wrapped around adjusting screws 15a which are journalled in suitable bearings extending through the side walls of the casing 3a of the liquid receptacle 1a. As shown in Fig. 4 the comparative plate 6a to be inspected is suspended with its lower reflecting surface 8 in juxtaposed parallel relation above the reflecting surface 18a the liquid 9a so that the respective interference beams from the two vertically spaced reflecting surfaces 8 and 18a will be reflected upwardly to the concave reflector 40, and then reflected downwardly by the concave reflector 40 through its focal point onto the small mirror 25a and then reflected and refracted respectively by the small mirror 25a and lens 27a, on an axis which passes through the small mirror 25b, slightly at one side thereof. This return or interference beam is received by the camera structure 33a in conventional manner and may be recorded on a sensitized surface 32a in the camera, or inspected on a ground glass focusing screen or similar image viewing screen in the focal plane of the camera. The elongated receptacle 3a is provided with an observation window 17a fixed in the wall thereof, valve controlled fluid conduit means 10a being provided for introducing or removing the reflecting liquid from the interior of the receptacle and regulating the quantity of the liquid to adjust the elevation of its reflecting surface.

In our invention shown in Fig. 4 the large convex mirror 40 which is employed has an area sufficient to substantially "cover" the comparative reflector plate 6a. The area of the liquid reflecting surface 18a is slightly larger than the reflecting surface area 8 (or 7) of the comparative plate 6a in order not to dispose the portion of the liquid reflecting surface 18a adjacent the side walls of the container in the entrance light beam, or directly under the comparative plate 6a.

A liquid, such as water, alcohol or other suitable non- or low-viscous liquid is preferably employed to produce the liquid reflecting surface 18 (or 18a).

In the interferometer apparatus shown in Fig. 4 the entire reflecting surface of the comparative plate is capable of simultaneous evaluation without disturbing the adjustment of the apparatus. In Figs. 1 to 3 the cover 4 is adjusted or rotated so as to progressively and selectively inspect and evaluate portions of the reflector plate 6. The optical inspection system is thus moved over the upper surface of the comparative plate in spaced relation thereto. The comparative plate 6a and the comparison reflecting surface 18a are, of course, co-extensive at all times and their relationship does not change with the movement of the rest of the optical inspection system in Fig. 4 that is carried by the cover 4a. The interference fringes which are obtained by this relationship are co-related to the evaluated reflecting surface of the comparative plate as a whole, and are not related to the smaller areas of the comparative plate which are progressively or selectively investigated when the cover 4a in Fig. 4 is adjusted to different positions.

Although only preferred forms of our invention are illustrated and described, it will become apparent to those skilled in the art that this is made in an exemplary sense, rather than a limiting sense, and numerous changes and modifications may be made therein without departing from the spirit of our invention as defined by the accompanying claims.

We claim:

1. In an optical testing apparatus for large size reflecting surfaces of flat plates, a closed cylindrical container having side walls, bottom and a rotatable cover, and adapted to contain a non-viscous liquid having a light reflecting surface; adjustable supporting means on the side walls for suspending a flat plate with a reflecting surface thereof to be compared, located in juxtaposed horizontal position parallel to and just above, or just below, the light reflecting surface of the non-viscous liquid when introduced into the container, a collimating lens suspended from the cover with its optical axis substantially, but not quite, perpendicular to the light reflecting surface of the liquid and located intermediate the center and periphery of the reflecting surface of the plate, a window in the top of the cover surrounding the axis of the collimating lens means, an inspection window in the side of the container, said collimating lens means being adjustable to dispose its focal point just above the window in the cover, a small reflector carried by the cover and inclined across the focal point of the collimating lens means at substantially 45 degrees to its axis, having a small reflecting area only just sufficient to encompass the focal point, a monochromatic light source, lens means carried by the cover for projecting a converging monochromatic light beam onto the small reflector through the focal point to illuminate the collimating lens means, a vertical support carried by the cover, an image screen carried by the support above the window in the cover, substantially perpendicular to the axis of the collimating lens means, a lens mounted on the support in the reflected return path of the interference beam, reflected partially by the liquid and plate reflecting surfaces through the collimating lens means and converged through the focal point of the collimating lens means adjacent to the small reflector, said lens means which is carried by the support having an image plane coincident with the image screen.

2. Apparatus as claimed in claim 1 wherein said lens means and image screen are carried by the support on the cover and comprise a camera structure which is adjustable vertically on the support to vary the size of the light wave interference image received thereby, and rotative adjustment of the cover moves the collimating lens and light source and camera around the central axis of the reflector plate whereby the entire surface of a large reflector plate to be investigated can be progressively explored with a collimating lens and light beam of smaller area than the area of the reflector plate.

3. In an interferometer apparatus for testing and evaluating the optical flatness of large reflector plates having optical light reflecting surfaces; a liquid container having an annular side wall; a bottom, and a cover for closing the same, a quantity of water therein covering the entire bottom to form an upper horizontal liquid reflecting comparative surface, said container being adapted to receive one of the large reflector plates horizontally therein with its periphery spaced from the container side walls, and in juxtaposed relation to the comparative reflecting surface of the water; means rigidly supported by the cover for projecting a collimated beam of monochromatic light downwardly toward the bottom of the container substantially perpendicular to the reflecting surface of the water, whereby the collimated beam is reflected upwardly, partly by the reflecting surface of the water and partly by the reflecting surface being compared of the reflector plate to form light wave interference beams; reflector means disposed in the interference beams for reflecting the same out of the collimated beam, including lens means having an image plane, an image screen disposed in the image plane for receiving a light wave interference image of the interference beams thereon, and adjustable supporting means within the container for supporting the large reflector plate with the reflecting surface thereof being compared, in closely spaced parallel relation to the comparison reflecting surface of the liquid in the container, said cover being rotatable on the top of the container and the light collimating means being mounted on the cover eccentrically thereof, so that rotative adjustment of the cover progressively moves the collimated light beam over the reflecting surface of the liquid and the reflecting surface being investigated of the reflector plate, so that the entire surface of the reflector plate can be selectively and progressively investigated by rotation of the cover.

THEODOR W. ZOBEL.
FERDINAND MIRUS.

References Cited in the file of this patent

UNITED STATES PATENTS

| Number | Name | Date |
|---|---|---|
| 1,044,502 | Crehore et al. | Nov. 19, 1912 |
| 2,215,211 | Devol | Sept. 17, 1940 |
| 2,253,054 | Tuttle et al. | Aug. 19, 1941 |
| 2,312,888 | Everest | Mar. 2, 1943 |
| 2,378,930 | Kendall et al. | June 26, 1945 |
| 2,410,502 | Hurley | Nov. 5, 1946 |
| 2,424,976 | Golay et al. | Aug. 5, 1947 |
| 2,452,364 | Fowler et al. | Oct. 26, 1948 |
| 2,472,991 | Sukumlyn | June 14, 1949 |

FOREIGN PATENTS

| Number | Country | Date |
|---|---|---|
| 239,120 | Germany | Oct. 10, 1911 |
| 569,046 | Great Britain | May 2, 1945 |

OTHER REFERENCES

Rayleigh—"Interference Bands and their Applications"—pages 72 through 78 of Proc. Roy. Inst., vol. 14, 1893.